US008811440B2

(12) United States Patent
Sandstrom

(10) Patent No.: US 8,811,440 B2
(45) Date of Patent: Aug. 19, 2014

(54) SYSTEM AND METHOD FOR SEED LASER MODE STABILIZATION

(75) Inventor: Richard L. Sandstrom, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 113 days.

(21) Appl. No.: 13/607,623

(22) Filed: Sep. 7, 2012

(65) Prior Publication Data
US 2014/0072006 A1 Mar. 13, 2014

(51) Int. Cl.
*H01S 3/00* (2006.01)
*H01S 3/13* (2006.01)

(52) U.S. Cl.
CPC ....................................... *H01S 3/13* (2013.01)
USPC .......... 372/38.01; 372/38.02; 372/10; 372/15; 372/20; 372/29.01; 372/29.011; 372/12; 372/13; 372/17; 372/98

(58) Field of Classification Search
CPC ........... H01S 5/141; H01S 5/005; H01S 5/02; H01S 5/14; H01S 3/00; H01S 3/06725; H01S 3/106; H01S 3/1305; H01S 3/137; H01S 5/02248; H01S 3/08059; H01S 3/08086; H01S 3/105; H01S 3/1307; H01S 3/1398; H01S 5/0656; H01S 3/0086; H01S 3/10; H01S 3/13; H01S 3/1068; H01S 3/1115; H01S 3/115; H01S 3/117; H01S 3/123; H01S 3/127; H01S 3/139
USPC .................... 372/38.01, 20, 98, 10, 15, 29.01, 372/29.011, 12, 13, 17; 219/121.61, 219/121.62, 121.73, 121.83; 700/166
See application file for complete search history.

(56) References Cited

U.S. PATENT DOCUMENTS

| | | | | |
|---|---|---|---|---|
| 5,412,673 A * | 5/1995 | Caprara et al. | ................... | 372/19 |
| 7,471,708 B2 | 12/2008 | Besaucele | | |
| 7,928,416 B2 * | 4/2011 | Fomenkov | ................ | 250/504 R |
| 8,000,212 B2 * | 8/2011 | Senekerimyan et al. | ..... | 369/121 |
| 8,138,487 B2 * | 3/2012 | Vaschenko et al. | ....... | 250/504 R |
| 8,653,491 B2 * | 2/2014 | Partlo et al. | ............... | 250/504 R |
| 2009/0296749 A1 | 12/2009 | Sucha | | |
| 2010/0258749 A1 * | 10/2010 | Partlo et al. | ............... | 250/504 R |
| 2011/0011837 A1 * | 1/2011 | Bastawros et al. | ....... | 219/121.61 |
| 2011/0079736 A1 * | 4/2011 | Hansson et al. | .......... | 250/504 R |
| 2011/0139760 A1 | 6/2011 | Shah | | |
| 2011/0317256 A1 | 12/2011 | Hou et al. | | |
| 2012/0092746 A1 | 4/2012 | Hou et al. | | |
| 2012/0193547 A1 * | 8/2012 | Hansson et al. | ............... | 250/372 |

* cited by examiner

*Primary Examiner* — Colleen A Matthews
*Assistant Examiner* — Delma R Forde
(74) *Attorney, Agent, or Firm* — Gard & Kaslow LLP

(57) ABSTRACT

A method and apparatus for stabilizing the seed laser in a laser produced plasma (LPP) extreme ultraviolet (EUV) light system are disclosed. In one embodiment, the cavity length of the laser may be adjusted by means of a movable mirror forming one end of the cavity. The time delay from the release of an output pulse to the lasing threshold next being reached is measured at different mirror positions, and a mirror position selected which results in a cavity mode being aligned with the gain peak of the laser, thus producing a minimum time delay from an output pulse of the laser to the next lasing threshold. A Q-switch in the laser allows for pre-lasing and thus jitter-free timing of output pulses. Feedback loops keep the laser output at maximum gain and efficiency, and the attenuation and timing at a desired operating point.

19 Claims, 10 Drawing Sheets

SYSTEM AND METHOD FOR SEED LASER MODE STABILIZATION

FIELD OF THE INVENTION

The present invention relates generally to laser produced plasma extreme ultraviolet light sources. More specifically, the invention relates to a method and apparatus for the use of seed lasers as such light sources.

BACKGROUND OF THE INVENTION

The semiconductor industry continues to develop lithographic technologies which are able to print ever-smaller integrated circuit dimensions. Extreme ultraviolet ("EUV") light (also sometimes referred to as soft x-rays) is generally defined to be electromagnetic radiation having wavelengths of between 10 and 120 nanometers (nm). EUV lithography is currently generally considered to include EUV light at wavelengths in the range of 10-14 nm, and is used to produce extremely small features, for example, sub-32 nm features, in substrates such as silicon wafers. To be commercially useful, it is desirable that these systems be highly reliable and provide cost effective throughput and reasonable process latitude.

Methods to produce EUV light include, but are not necessarily limited to, converting a material into a plasma state that has one or more elements, e.g., xenon, lithium, tin, indium, antimony, tellurium, aluminum, etc., with one or more emission line(s) in the EUV range. In one such method, often termed laser produced plasma ("LPP"), the required plasma can be produced by irradiating a target material, such as a droplet, stream or duster of material having the desired line-emitting element, with a laser beam at an irradiation site. The line-emitting element may be in pure form or alloy form, for example, an alloy that is a liquid at desired temperatures, or may be mixed or dispersed with another material such as a liquid.

In some prior art LPP systems, droplets in a droplet stream are irradiated by a separate laser pulse to form a plasma from each droplet. Alternatively, some prior art systems have been disclosed in which each droplet is sequentially illuminated by more than one light pulse. In some cases, each droplet may be exposed to a so-called "pre-pulse" to heat, expand, gasify, vaporize, and/or ionize the target material and/or generate a weak plasma, followed by a so-called "main pulse" to generate a strong plasma and convert most or all of the pre-pulse affected material into plasma and thereby produce an EUV light emission. It will be appreciated that more than one pre-pulse may be used and more than one main pulse may be used, and that the functions of the pre-pulse and main pulse may overlap to some extent.

Since EUV output power in an LPP system generally scales with the drive laser power that irradiates the target material, in some cases it may also be considered desirable to employ an arrangement including a relatively low-power oscillator, or "seed laser," and one or more amplifiers to amplify the pulses from the seed laser. The use of a large amplifier allows for the use of the seed laser while still providing the relatively high power pukes used in the LPP process.

However, even with the use of a seed laser, it is still desirable to generate a sufficiently large laser pulse so that the need for amplification can be limited. Suppose that a design calls for pulses of 1 kW (1,000 watts) from a seed laser, which are then amplified. One could generate such a 1 kW pulse by using a 1 kW laser in continuous mode, i.e. constant output, and passing the resulting beam through a very fast shutter. Such a solution would be extremely wasteful, as the typical duty cycle, i.e., the ratio between the duration of the pulse to the time between pulses, is very low, typically on the order of 1%. Thus, 99% of the output power of the laser would be wasted.

For this reason and others, various techniques of obtaining better utilization of laser output have been developed in which the laser does not operate continuously but rather builds up power until a pulse is released. One well-known technique is Q-switching, sometimes known as giant pulse formation, which allows a laser to produce pulses of much greater power than if the laser were operated in continuous mode.

Q-switching is achieved by putting some type of variable attenuator inside the laser's optical cavity (the "Q-switch") that is externally controlled. The Q-switch functions as a type of shutter, and may for example be an acousto-optic module (AOM) that can be adjusted by the application of a control signal to pass differing amounts of the light incident upon it. The Q-switch is initially closed, which prevents the laser from lasing and allows the energy stored in the laser medium to increase. The Q-switch is then quickly opened, allowing for all of the built up energy to be released in a relatively short pulse.

For example, using Q-switching, a laser might generate pulses that are each ½ microsecond (µs) long at a rate of 50,000 to 100,000 times per second, thus allowing power to build up for 10 to 20 µs between pulses. In this way, a laser that would generate 50 watts in continuous mode may generate pulses of 500 watts to 1 kW.

However, Q-switching with an infrared laser, such as a $CO_2$ laser, suffers from another problem. When the Q-switch is opened, allowing lasing to occur, there is a statistical uncertainty as to when the first photons will be emitted within the cavity, so that the precise timing of when the pulse will be generated is not predictable. Typically there will be nothing for 100 to 200 nanoseconds (ns), and sometimes as long as 400 ns. This "temporal fitter" is not a shutter problem, as operation of the Q-switch is predictable while the beginning of lasing is not.

A known modification of Q-switching is to have the seed laser "pre-lase," i.e., to lase at a low level that does not use all of the power building up in the seed laser. In this case, the Q-switch is not "completely closed" as above, but rather provides partial attenuation of the laser energy. The amount of attenuation present before the Q-switch is opened determines the "lasing threshold," the level at which a pre-pulse is created and laser oscillation builds up rather than dies; the less attenuation there is by the Q-switch ("decreasing Q-switch drive"), the lower the lasing threshold and the faster the pre-pulse starts. The Q-switch is ideally set at a level that does not use much power so that power may build up in the seed laser. The Q-switch is then fully opened, allowing all of the power that has built up in the seed laser to generate a large pulse.

Pre-lasing also suffers from temporal jitter, but as long as pre-lasing occurs, a larger pulse will occur when the shutter is opened. Thus, the timing of the large puke is much more predictable than in ordinary Q-switching. The cost of this is reduced power; if a laser can produce a pulse of 1 kW with ordinary Q-switching, it might produce only 500 watts when pre-lasing is used.

Pre-lasing suffers from a different timing problem, however. If pre-lasing occurs too early, gain of the seed laser will be reduced. If pre-lasing occurs too late, it may not occur before the Q-switch is opened, and no lasing will occur at all in the seed laser.

There is also another problem that is separate from, and not solved by, Q-switching or pre-lasing. As is known in the art, a laser has a number of possible "cavity modes" at certain frequencies that depend upon the length of the laser cavity. If the relationship of those frequencies to the laser's gain changes due to a change in the cavity length, for example due to thermal effects, the available power of the laser can decrease significantly. A change in cavity length of even a few microns can have a substantial effect on the seed laser output power.

Accordingly, it is desirable to have an improved system and method for stabilizing a seed laser by controlling both cavity length and pre-lasing while still producing periodic pulses such that the seed laser output power is maximized for use in such an EUV light source.

SUMMARY OF THE INVENTION

Disclosed herein are a method and apparatus for stabilizing the seed laser(s) in a laser produced plasma (LPP) extreme ultraviolet (EUV) light system.

In one embodiment, a system for producing output laser pulses is disclosed, comprising: a laser having an optical cavity including a movable optical component at one end, such that moving the optical component changes the length of the optical cavity, and lasing when power in the optical cavity reaches a lasing threshold; an actuator for positioning the optical component within a predetermined range; a variable attenuator in the optical cavity for limiting the rate at which power in the laser increases and thus controlling the time at which the lasing threshold is reached and the time at which the output puke is released; a sensor for measuring the output power of the laser at a given moment; a computing device for calculating the time delay from the release of an output pulse to the time the lasing threshold is again readied; a first feedback loop having a first controller for causing the actuator to position the optical component so that the time delay from the release of an output pulse to the time the lasing threshold is again reached is at a minimum; and a second feedback loop having a second controller for causing an adjustment in the variable attenuator based upon the calculated time delay to keep the time delay from the release of an output pulse to the time the lasing threshold is again reached at a desired value.

Another embodiment discloses a method of maximizing the output of a laser that produces output pulses, the laser having an optical cavity with a length and including an optical component at one end that is movable through a predetermined range, such that moving the optical component changes the length of the optical cavity, lasing occurring when power in the optical cavity reaches a lasing threshold, and a variable attenuator in the optical cavity for limiting a rate at which power increases in the laser and thus controlling a time at which the lasing threshold is reached and a time at which an output pulse is released, the method comprising: operating the laser by a computing device while moving the optical component through the predetermined range of motion; measuring with a sensor an output energy of the laser at a plurality of times during the moving of the optical component; calculating by the computing device a time delay from the release of an output puke to the lasing threshold next being reached; selecting by the computing device a position of the optical component at which the time delay is at a minimum; moving the optical component to the selected position by an actuator based upon the selected position; and adjusting the variable attenuator by a controller based upon the measured time delay to keep the time delay at a desired value.

In still another embodiment a non-transitory computer-readable medium is disclosed, having embodied thereon a program, the program being executable by a processor to perform a method of maximizing the output of a laser that produces output pulses, the laser having an optical cavity with a length and including an optical component at one end that is movable through a predetermined range, such that moving the optical component changes the length of the optical cavity, lasing occurring when power in the optical cavity reaches a lasing threshold, and a variable attenuator in the optical cavity for limiting a rate at which power increases in the laser and thus controlling a time at which the lasing threshold is reached and a time at which an output pulse is released, the method comprising the steps of: operating the laser by a computing device while moving the optical component through the predetermined range of motion; measuring with a sensor an output energy of the laser at a plurality of times during the moving of the optical component; calculating by the computing device a time delay from the release of an output pulse to the lasing threshold next being reached; selecting by the computing device a position of the optical component at which the time delay is at a minimum; moving the optical component to the selected position by an actuator based upon the selected position; and adjusting the variable attenuator by a controller based upon the measured time delay to keep the time delay at a desired value.

DETAILED DESCRIPTION OF THE INVENTION

The present application describes a method and apparatus for stabilizing a seed laser source(s) such as might be used in a laser produced plasma (LPP) extreme ultraviolet (EUV) light system.

In one embodiment, a method of stabilizing a seed laser source involves adjusting the cavity length of the laser by ill cans of a movable mirror forming one end of the cavity. The average output energy of the laser is measured at different mirror positions, and a mirror position selected which results in a cavity mode being aligned with the gain peak of the laser, thus producing a minimum pre-lasing delay from the termination of the previous pulse to the resumption of pre-lasing for the next output pulse, and thus jitter-free timing of output pulses. Feedback loops keep the laser output at maximum gain and efficiency, and the attenuation and timing at a desired operating point.

Figure 1:
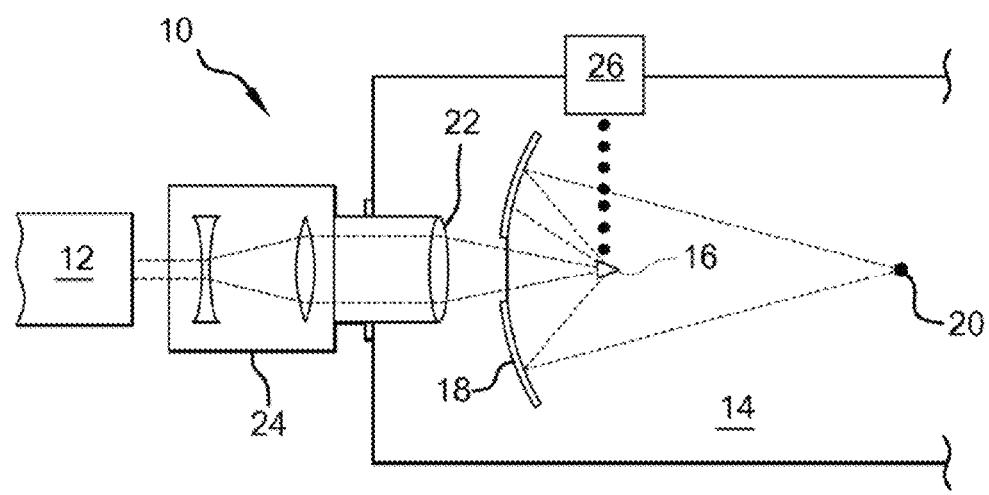
FIG. 1 is an illustration of some of the components of an embodiment of an LPP EUV system.

FIG. 1 is a simplified schematic view of some of the components of one embodiment of an LPP EUV light source 10. As shown in FIG. 1, the EUV light source 10 includes a laser source 12 for generating a beam of laser pulses and delivering the beam along one or more beam paths from the laser source 12 and into a chamber 14 to illuminate a respective target, such as a droplet, at an irradiation region 16. Examples of laser arrangements that may be suitable for use in the system 12 shown in FIG. 1 are described in more detail below.

As also shown in FIG. 1, the EUV light source 10 may also include a target material delivery system 26 that, for example, delivers droplets of a target material into the interior of chamber 14 to the irradiation region 16, where the droplets will interact with one or more laser pulses to ultimately produce plasma and generate an EUV emission. Various target material delivery systems have been presented in the prior art, and their relative advantages will be apparent to those of skill in the art.

As above, the target material is an EUV emitting element that may include, but is not necessarily limited to, a material that includes tin, lithium, xenon or combinations thereof. The target material may be in the form of liquid droplets, or alternatively may be solid particles contained within liquid droplets. For example, the element tin may be presented as a target material as pure tin, as a tin compound, such as $SnBr_4$, $SnBr_2$, $SnH_4$, as a tin alloy, e.g., tin-gallium alloys, tin-indium alloys, or tin-indium-gallium alloys, or a combination thereof. Depending on the material used, the target material may be presented to the irradiation region 16 at various temperatures including room temperature or near room temperature e.g., tin alloys or $SnBr_4$), at a temperature above room temperature (e.g., pure tin), or at temperatures below room temperature (e.g., $SnH_4$), in some cases, these compounds may be relatively volatile, such as $SnBr_4$. Similar alloys and compounds of EUV emitting elements other than tin, and the relative advantages of such materials and those described above will be apparent to those of skill in the art.

Returning to FIG. 1, the EUV light source 10 may also include an optical element 18 such as a near-normal incidence collector mirror having a reflective surface in the form of a prolate spheroid (i.e., an ellipse rotated, about its major axis), such that the optical element 18 has a first focus within or near the irradiation region 16 and a second focus at a so-called, intermediate region 20, where the EUV light may be output from the EUV light source 10 and input to a device utilizing EUV light such as an integrated circuit lithography tool (not shown). As shown in FIG. 1, the optical element 18 is formed with an aperture to allow the laser light pulses generated by the laser source 12 to pass through and, reach the irradiation region 16.

The optical element 18 should have an appropriate surface for collecting the EUV light and directing it to the intermediate region 20 for subsequent delivery to the device utilizing the EUV light. For example, optical element 18 might have a graded multi-layer coating with alternating layers of molybdenum and silicon, and in some cases, one or more high temperature diffusion barrier layers, smoothing layers, capping layers and/or etch stop layers.

It will be appreciated by those of skill in the art that optical elements other than a prolate spheroid mirror may be used as optical element 18. For example, optical element 18 may alternatively be a parabola rotated about its major axis or may be configured to deliver a beam having a ring-shaped cross section to an intermediate location. In other embodiments, optical element 18 may utilize coatings and layers other than or in addition to those described herein. Those of skill in the art will be able to select an appropriate shape and composition for optical element 18 in a particular situation.

As shown in FIG. 1, the EUV light source 10 may include a focusing unit 22 which includes one or more optical elements for focusing the laser beam to a focal spot at the irradiation site. EUV light source 10 may also include a beam conditioning unit 24, having one or more optical elements, between the laser source 12 and the focusing unit 22, for expanding, steering and/or shaping the laser beam, and/or shaping the laser pulses. Various focusing units and beam conditioning units are known in the art, and may be appropriately selected by those of skill in the art.

Figure 2:
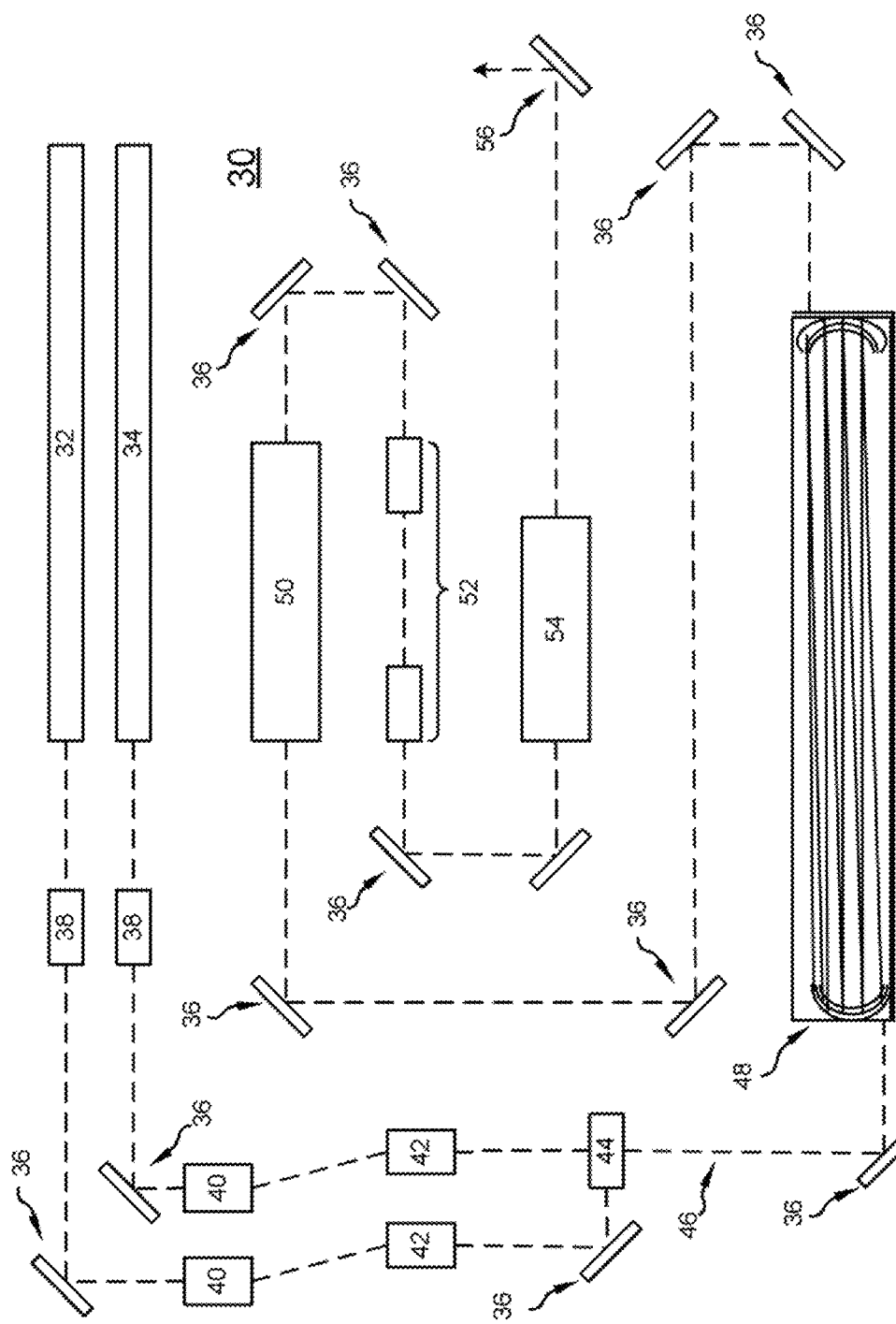
FIG. 2 is an illustration of some of the components of a seed laser module that may be used in an LPP EUV system.

As noted above, in some cases an LPP EUV system uses one or more seed lasers to generate laser pulses, which may then be amplified to become the laser beam that irradiates the target material at irradiation site 16 to form a plasma that produces the EUV emission. FIG. 2 is a simplified schematic view of one embodiment of a seed laser module 30 that may be used as part of the laser light source in an LPP EUV system.

As illustrated in FIG. 2, seed laser module 30 includes two seed lasers, a pre-pulse seed laser 32 and a main pulse seed laser 34. One of skill, in the art will appreciate that where such an embodiment containing two seed lasers is used, the target material may be irradiated first by one or more pulses from the pre-pulse seed laser 32 and then by one or more pulses from the main pulse seed laser 34.

Seed laser module 30 is shown as having a "folded" arrangement rather than arranging the components in a straight line. In practice, such an arrangement is typical in order to limit the size of the module. To achieve this, the beams produced by the laser pulses of pre-pulse seed laser 32 and main pulse seed laser 34 are directed onto desired beam paths by a plurality of optical components 36. Depending upon the particular configuration desired, optical components 36 may be such elements as lenses, filters, prisms, mirrors or any other element which may be used to direct the beam in a desired direction. In some cases, optical components 36 may perform other functions as well, such as altering the polarization of the passing beam.

As is known to those of skill in the art, the seed lasers 32 and 34 contain within them relatively fragile optical components, such as the output coupler, polarizer, rear mirror, grating, acousto-optical modulation (AOM) or electro-optical modulation (EOM) switches, etc (such elements within the seed lasers 32 and 34 are not shown). Thus, it is desirable to prevent any light that may be reflected from the target material at the irradiation site from reaching and damaging these components or otherwise interfering with the stable operation of the seed laser.

In the embodiment of FIG. 2, the beams from each seed laser are first passed through an electro-optic modulator 38 (EOM). The EOMs 38 are used with the seed lasers as pulse shaping units to trim the pulses generated by the seed lasers to pulses having shorter duration and faster rise-time and fall-time. A shorter pulse duration and relatively fast fall-time may increase EUV output and light source efficiency because of a short interaction time between the pulse and a target, and because unneeded portions of the pulse do not deplete amplifier gain. While two separate pulse shaping units (EOMs 38) are shown, alternatively a common pulse shaping unit may be used to trim both pre-pulse and main pulse seeds.

The beams from the seed lasers are then passed through acousto-optic modulators (AOMs) 40 and 42. As will be explained below, the AOMs 40 and 42 act, as "switches" or "shutters," which operate to divert any reflections of the laser pulses from the target material from reaching the seed lasers; as above, seed lasers typically contain sensitive optics, and the AOMs 40 and 42 thus prevent any reflections from causing damage to the seed laser elements. In the embodiment shown here, the beams from each seed laser pass through two AOMs; each AOM causes a frequency and wavelength shift in the passing beam, and the second AOM on each beam path is oriented such that the shift is the opposite of the first AOM and thus reverses the shift of the first AOM. One of skill in the art will appreciate how it will be possible in some embodiments to pass the beams from each seed laser through only a single AOM on each path, and what the effects of such a configuration will be.

After passing through the AOMs 40 and 42, the two beams are "combined" by beam combiner 44. Since the pre-pulse seed laser and main pulse seed laser have slightly different wavelengths, in one embodiment, beam combiner 44 may be a dichroic beam splitter; one of skill in the art will recognize other was of accomplishing this. Since the pulses from each seed laser are generated at different times, this really means that the two temporally separated beams are placed on a common beam path 46 for further processing and use.

After being placed on the common beam path, the beam from one of the seed lasers (again, there will only be one at a time) passes through a beam delay unit 48 such as is known in the art and as will be explained further below. Next, the beam is directed through a pre-amplifier 50 and then through a beam expander 52. Following this, the beam passes through a thin film polarizer 54, and is then directed onward by optical component 56, which again is an element which directs the beam to the next stage in the LPP EUV system and may perform other functions as well. From optical component 56, the beam typically passes to one or more optical amplifiers and other components, as will be illustrated below.

Various wavelength tunable seed lasers that are suitable for use as both pre-pulse and main pulse seed lasers are known in the art. For example, in one embodiment a seed laser may be a $CO_2$ laser having a sealed filling gas including $CO_2$ at sub-atmospheric pressure, for example, 0.05 to 0.2 atmospheres, and pumped by a radio-frequency discharge. In some embodiments, a grating may be used to help define the optical cavity of the seed laser, and the grating may be rotated to tune the seed laser to a selected rotational line.

If the seed laser is to provide an effective pulse that may be amplified to irradiate the target material, certain conditions are desirable. First, the seed laser should provide a certain amount of power so as to limit the amount of amplification that is required. Further, the timing of the pulses should be controllable within some range to allow the pulses to be coordinated with the presence of the target material at the irradiation site. It will be appreciated by one of skill in the art that these issues are related.

In a laser, light is amplified in a resonant optical cavity which typically includes two or more mirrors which reflect the light between them. Every laser produces light over a range of frequencies, or bandwidth, called the "gain bandwidth" or "small signal gain." The gain bandwidth, which is determined primarily by the gain medium included in the optical cavity, is typically a Lorentzian function with a single peak, and thus has as gain peak at a central wavelength and central frequency. For example, a $CO_2$ laser at a gas pressure of 60 hPa has a gain bandwidth of about 270 MHz, measured by the full width half maximum (FWHM), a well known bandwidth measure, with one of its central wavelengths at 10.59 microns.

Since light is a wave, the light bouncing between the mirrors at the ends of the cavity will constructively and destructively interfere with itself, leading to the formation of standing waves between the mirrors. These standing waves form a discrete set of frequencies and are known as "longitudinal cavity modes." Longitudinal cavity modes are the only frequencies of light which are self-regenerating and allowed to oscillate by the cavity, and depend upon the length of the cavity of the laser.

In general, the longitudinal cavity modes are spaced at wavelengths where the cavity round-trip optical distance is an exact multiple of the wavelength. For a cavity which is sufficiently longer than the wavelength of the light, the spacing between modes (also known as the free spectral range or FSR) will be a difference in frequency given by $c/2L$, where c is the speed of light and L is the length of the resonant cavity. In the case of a cavity of 1.6 meters, the frequency spacing between modes will be about 93 MHz.

Since the gain bandwidth of a $CO_2$ laser at 60 hPA fill pressure is 270 MHz, and in the case of a 1.6 meter cavity the modes are about 93 MHz apart, there will be several modes within the gain bandwidth curve. (The existence of several modes within a gain bandwidth curve is typical for most lasers.) In this situation, the mode having the highest gain, i.e., the one that is under the highest part of the gain bandwidth curve, will dominate oscillation of the laser and all of the available power of the laser will be available from that mode (if one mode has enough gain it will extinguish the other modes).

Figure 3:
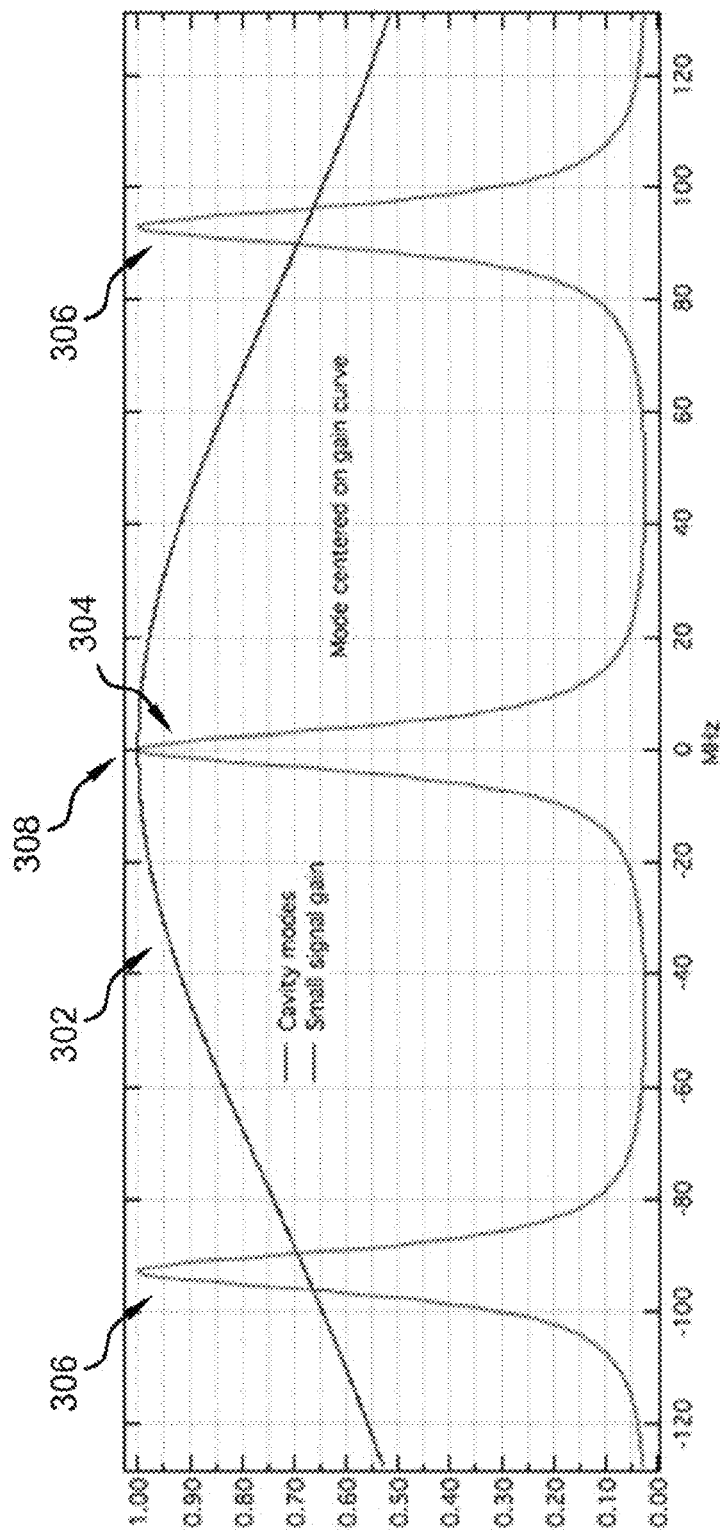
FIG. 3 is a graph of the gain bandwidth curve and cavity modes in a sample seed laser with a cavity mode aligned with the gain peak.

It is thus preferable to have one of the cavity modes aligned, with the gain peak, i.e., the highest point in the gain, bandwidth curve. FIG. 3 illustrates the gain bandwidth curve 302 and cavity modes 304 and 306 of a $CO_2$ laser, with one of the cavity modes 304 aligned with the highest point 308 in the gain bandwidth curve 302, the "gain peak." Since mode 304 has greater gain than the other modes 306 (since the gain, bandwidth curve is higher at the frequency of mode 304 than for the other modes 306), and since mode 304 is aligned with the gain peak 308, essentially all of the available power will be in that mode and the output power of the laser is maximized.

Similarly, because gain is reduced at wavelengths away from the center wavelength, operating in a mode that is off-center will result in reduced power output of the seed laser. Even a frequency that is offset 30 MHz from the central frequency will result in a reduction of the small signal gain, and thus output power, of approximately 5%. Further, since the seed laser power is amplified before arriving at the irradiation site, the reduction, in output power of the seed laser will likewise be amplified, and the effect increased by the fact that the amplifiers operate most efficiently on an optimum center frequency. Where a seed laser frequency that is not optimum might only cause a 5% drop in the output power of the seed laser, it may also result in the small signal gain, of the amplifiers being reduced. Thus, since the high-power output is exponentially dependent upon the small signal gain, the amplified output can drop by much more, possibly by as much as over 25%, depending upon the overall gain-length product for the amplifiers.

Figure 4:
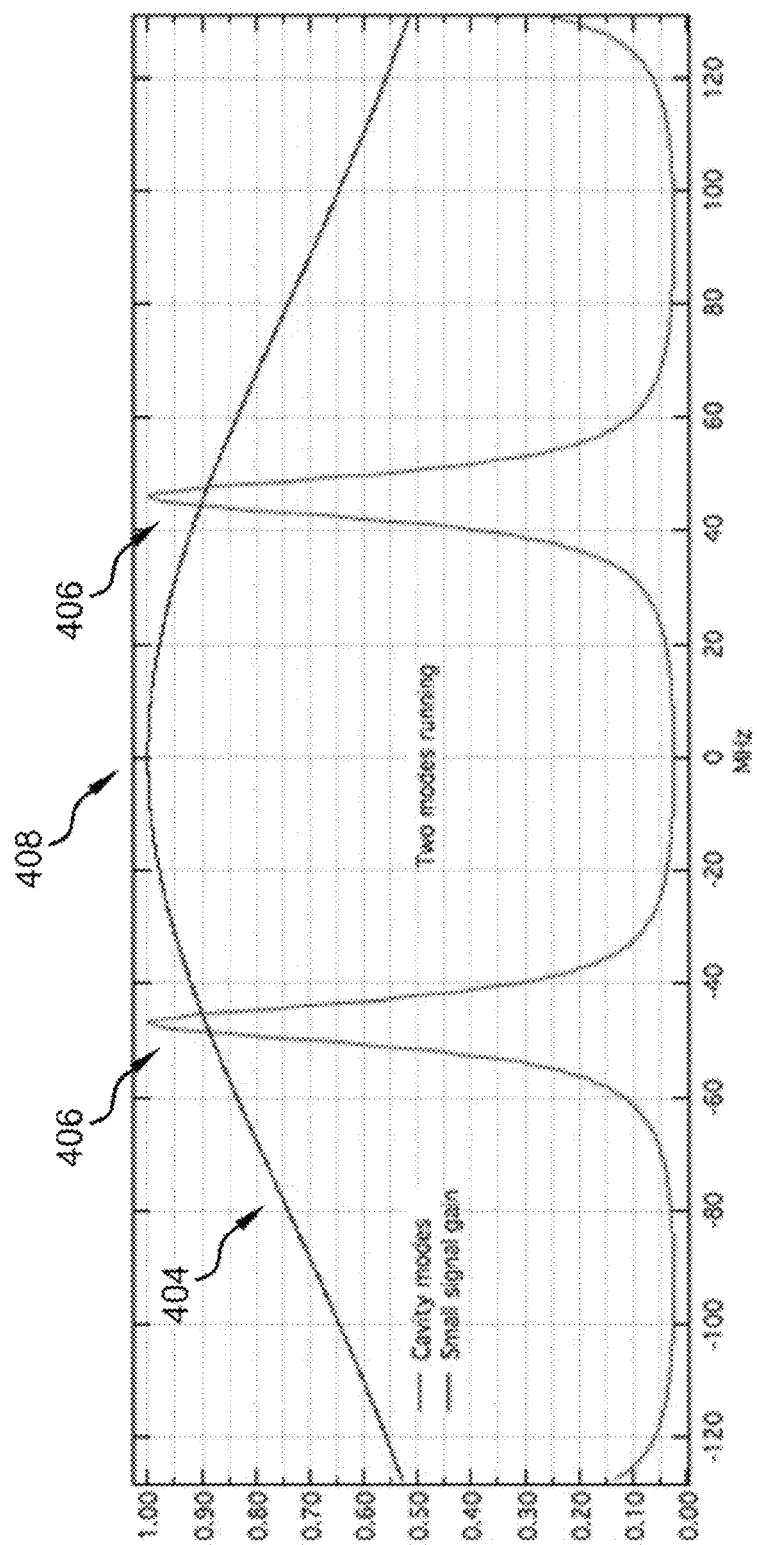
FIG. 4 is another graph of the gain bandwidth curve and cavity modes in a sample seed laser with cavity modes offset from the gain peak.
Figure 5:
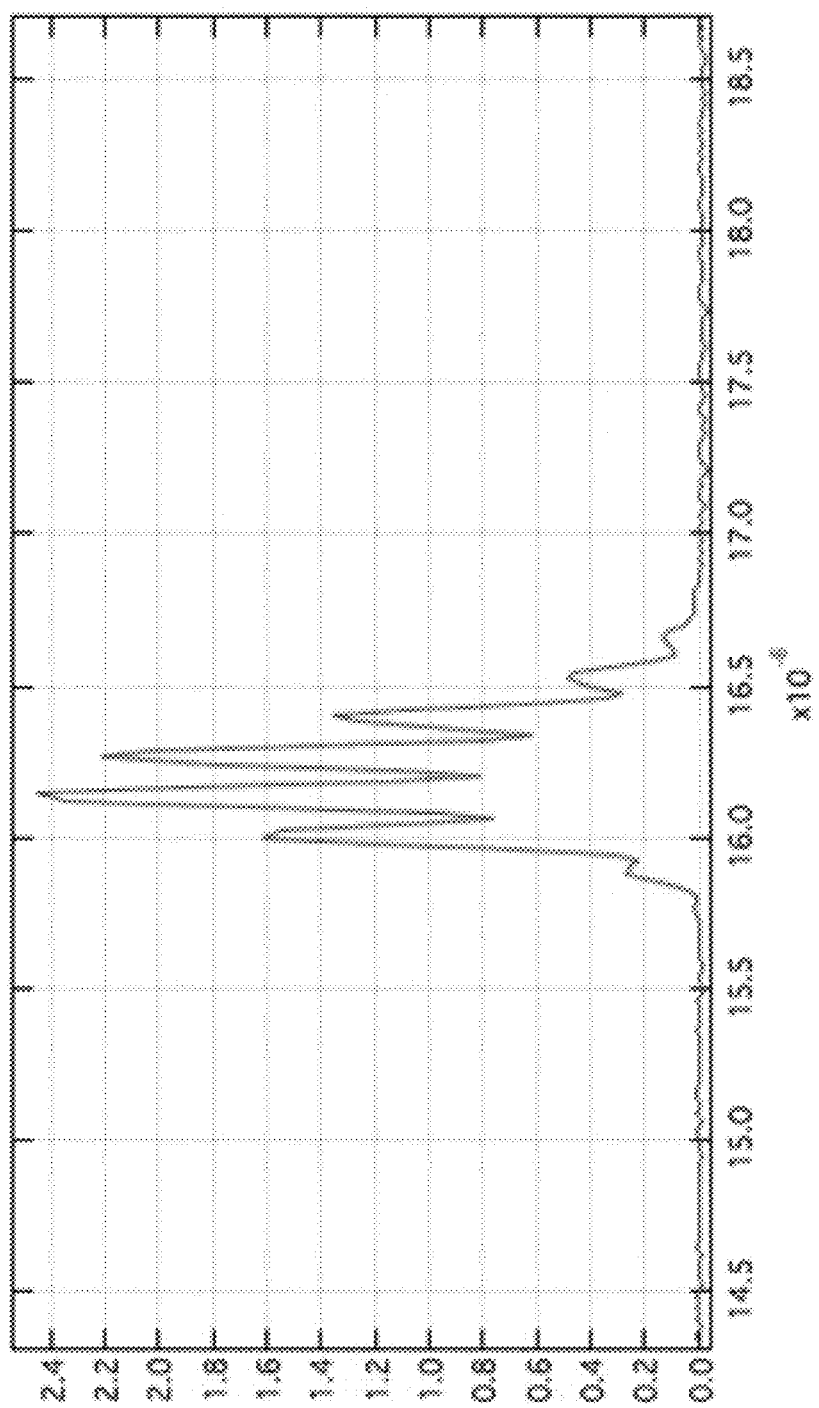
FIG. 5 is a graph of a pulse from a seed laser that is subject to mode beating.

Modes that are not aligned with the gain peak ("offset modes") can cause other problems as well. FIG. 4 illustrates two modes 406 that are spaced approximately equidistant from the gain peak 408 of the gain bandwidth curve 404. In this situation, since neither mode has significantly greater gain, both modes 406 will oscillate, and this will produce artifacts on the output pulse with a frequency of about 93 MHz. This is known as "mode beating;" an example of such a pulse is shown in FIG. 5. This causes an undesirable disruption of the pulse shape, as can be seen in FIG. 5, as well as reduced power due to the fact that neither mode 406 corresponds to the gain peak 408. Where the modes are not equidistant from the gain peak there will be a reduced amount of beating, which is still undesirable.

In another situation, if the length of the cavity changes, the cavity modes will slowly drift through the gain bandwidth. In this case, as different modes pass through the gain peak, the output wavelength can discontinuously jump from one mode to another; this effect is called "mode hopping."

It will be apparent that the length of the cavity is critical in establishing the cavity modes, since variations in the length of the cavity cause changes in both the center wavelength of the cavity and the difference between modes. The length of the cavity may change for a variety of reasons; the primary reason is thermal expansion of the structure holding the mirrors, but the cavity length may also possibly vary due to changes in the index of refraction of elements within the cavity such as windows or the laser gain medium, etc.

For these reasons, a key to stabilizing the mode of the seed laser is maintaining a constant cavity length. This must be done to a fine tolerance, since in the case of a $CO_2$ laser a change in length of even 5 microns will result in switching from one mode to another, with an extremely small change in the periodicity of the laser. Thus, it is desirable to keep the cavity length constant to within 1 micron.

One way to do this is to attempt to control the cavity length by using materials with low coefficients of thermal expansion and/or by carefully controlling the temperature of the cavity, so that the cavity length does not change significantly due to thermal expansion.

However, such "passive" techniques have limitations. In order to maintain a constant temperature, the laser will typically need to be chilled in some fashion, and even then precise control is extremely difficult. For example, even if a water chiller is used to cool the laser, the "stables" temperature may vary as the water recycles.

Alternatively, the length of the cavity may be controlled actively by moving one of the cavity mirrors under the control of a suitable feedback signal, or in some cases by moving a grating within the cavity. Such active control is able to keep the cavity length constant with better precision than passive techniques if an appropriate control signal is used.

Figure 6:
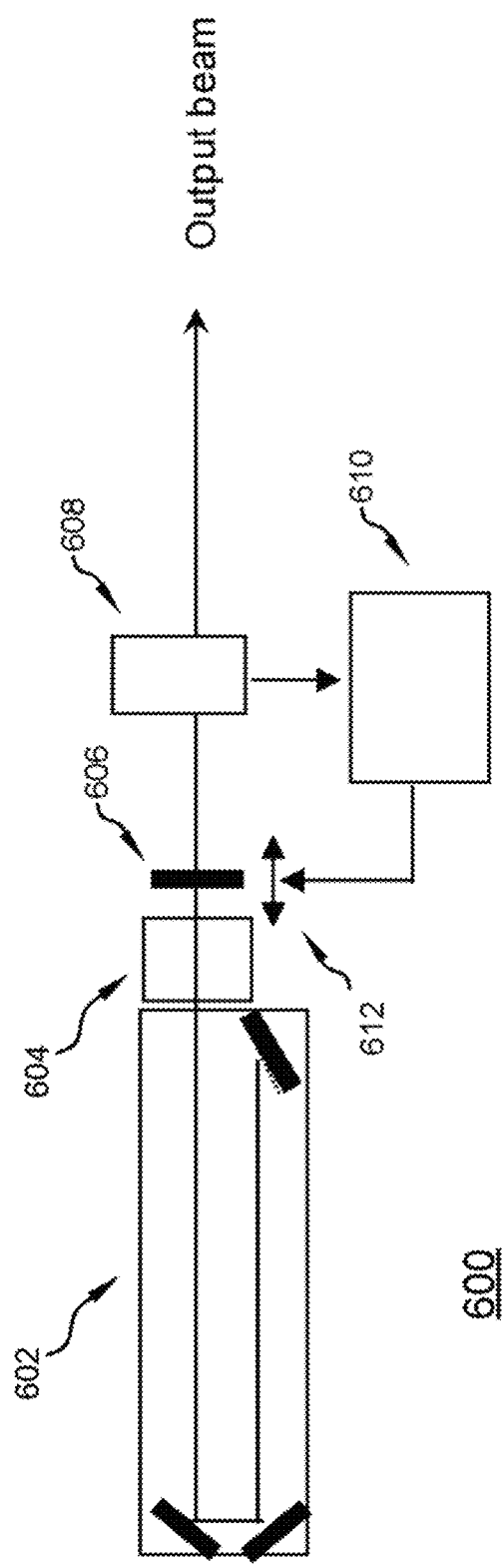
FIG. 6 is a simplified block diagram of a system for adjusting the cavity length of a seed laser in one embodiment.

FIG. 6 is a simplified block diagram of a system 600 for adjusting the cavity length of a seed laser 602. A Q-switch 604 allows power to build up in the seed laser 602 as described above. A movable mirror 606 defines one end of the seed laser cavity. A sensor 608 measures one or more parameters of the output beam. A control module 610 uses the measured parameter(s) to determine appropriate adjustments to the laser cavity length, and sends commands to an actuator 612 to move the mirror 606 in accordance with the determined adjustments.

The mirror 606 and actuator 612 will preferably have certain characteristics making them suitable for use with the seed laser 602. Mirror 606 is preferably movable over a distance at least equal to a few wavelengths of the light to be output from the seed laser 602 without inducing tilt that can misalign the optical cavity; thus, mirror 606 should itself be able to tilt if necessary. The actuator 612 will preferably be able to move mirror 606 over an adjustment range that includes at least 3 cavity modes (in the described case a drive range of at least 15 microns and tilt mirror 606 within a certain range. In one embodiment, such an actuator may be driven by a piezoelectric transducer (PZT). One of skill in the art will be able to select a suitable actuator in light of these and other considerations.

In addition to controlling the length of the laser cavity, it is desirable to simultaneously control the timing of pre-lasing when Q-switching is used to obtain the greatest power from the seed laser. As above, there are two factors that affect when pre-lasing begins. First, as above, the lower the Q-switch attenuation before the switch is opened, the sooner the lasing threshold will be reached and pre-lasing will occur.

Second, when a cavity mode is located at the peak of the gain bandwidth, power will build up more quickly than when there are only offset modes away from the gain peak. Thus, when a partly open Q-switch is used as described above, it is expected that the lasing threshold will be reached, and pre-lasing will thus occur, sooner when a cavity mode is located at the gain peak than when only offset modes are present. Having the cavity mode located at the gain peak also results in the greatest output power from the seed laser.

The issue is finding an appropriate parameter that will allow for control of both the cavity length and the timing of the laser pulses.

Figure 7:
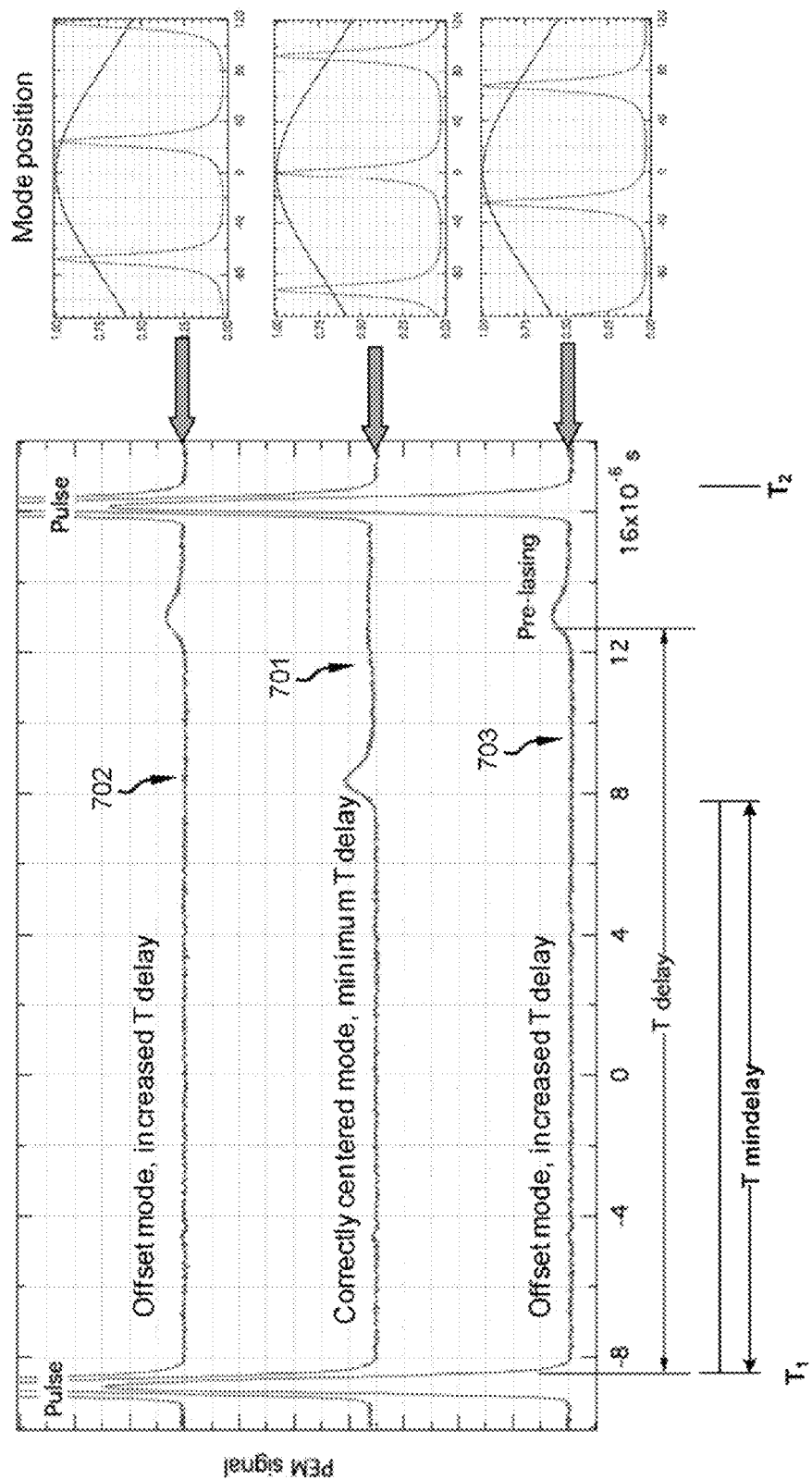
FIG. 7 is a graph showing the relationship of the time delay from a full pulse output of a seed laser to the beginning of pre-lasing for the next pulse and the position of the cavity modes.

FIG. 7 shows three plots 701 to 703 of the output power of a seed laser from the emission of one pulse at a time $T_1$ to the next pulse at a time $T_2$. The output power is measured by a sensor. In one embodiment, this is a photo-electromagnetic ("PEM") sensor; other types of fast optical sensors suitable for measuring the output power will be apparent to one of skill in the art, such as photoconductive or photovoltaic sensors. Since as above the seed laser begins to pre-lase when the power in the laser reaches a certain point, the graph of the output power also shows the time delay from a full pulse output at time $T_1$ to the beginning of pre-lasing for the next pulse.

In the center curve 701, a cavity mode is centered at the gain peak, while in the top and bottom curves 702 and 703 only offset modes not located at the gain peak are present. For curves 702 and 703, it can be seen that the time delay from the pulse at time $T_1$ to pre-lasing is indicated by $T_{delay}$, while for curve 701, the time delay is a shorter time $T_{mindelay}$. This is as expected, since as described above the power in the laser will build up more quickly where a cavity mode is aligned with the gain peak. Thus, in curve 701, the delay time $T_{mindelay}$ from a full pulse to the beginning of pre-lasing is at a minimum, shorter than when there are only offset modes present as in curves 702 and 703.

To find the optimum mode alignment, the actuator is moved through a small range of motion, for example 5% of a cavity free-spectral range (FSR), thus moving the mirror and changing the cavity length, and the delay time $T_{delay}$ from the end of the previous pulse to the beginning of pre-lasing is measured. If the FSR is, for example, 5 microns, the actuator, and thus the mirror, is moved through about 5% of the FSR, or 0.25 microns, of motion. This results in the pre-lasing delay varying with the position of the mirror. The frequencies of the modes in the laser cavity will change and the modes will appear to move across the gain bandwidth curve; as this occurs, the delay time $T_{delay}$ is measured over the range of the mirror movement.

Figure 8:
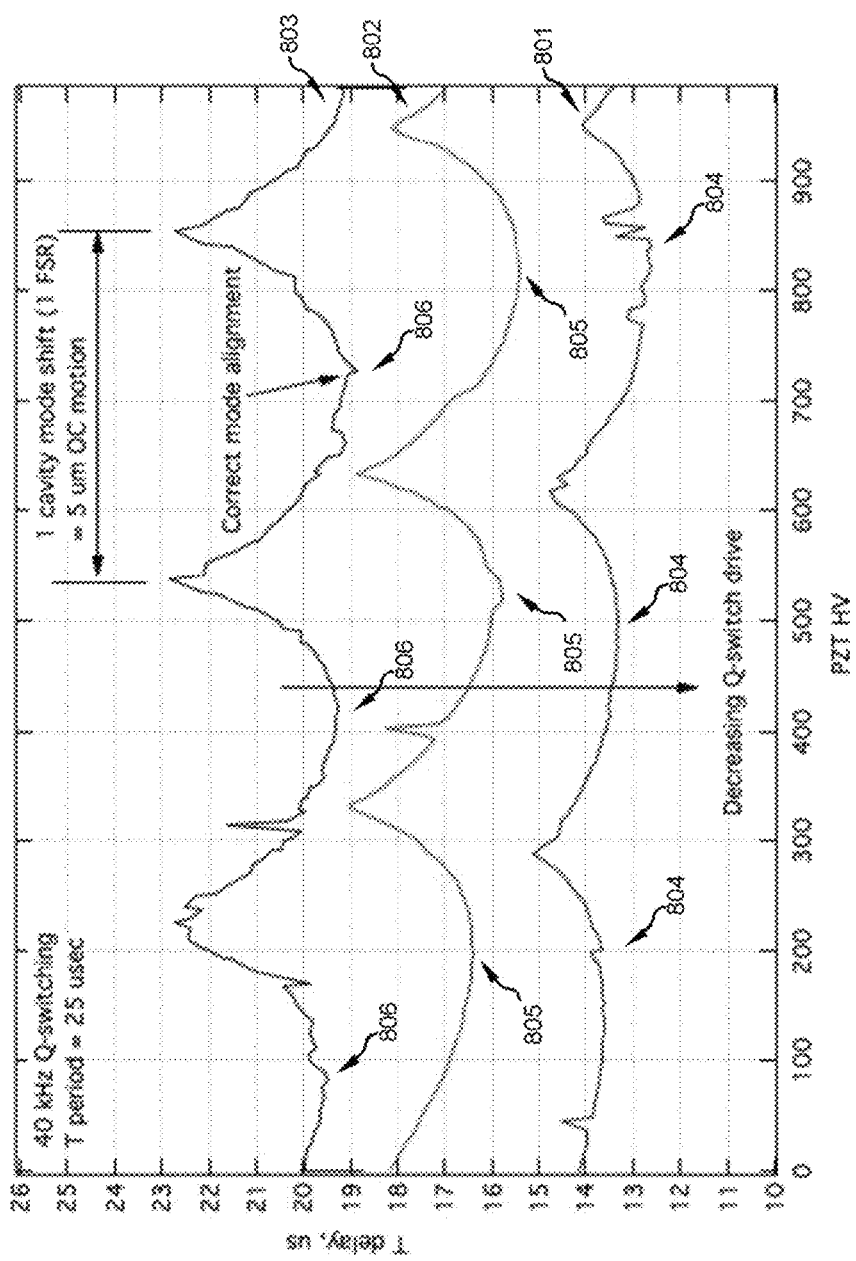
FIG. 8 is a graph showing the relationship of the time delay from a full pulse output of a seed laser to the beginning of pre-lasing for the next pulse and movement of a mirror that defines the cavity length of the seed laser.

FIG. 8 shows a test plot of this type (the actuator movement, and thus mirror position, is represented by the voltage to the PZT on the horizontal axis) and represents a transfer function between the output of the seed laser and the signal to the mirror actuator. The three curves 801, 802 and 803 on FIG. 8 represent different attenuations by the Q-switch before it is opened. As above, the lower the Q-switch attenuation, the sooner pre-lasing will occur and the shorter $T_{delay}$ becomes. Thus, the lowest curve 801 on FIG. 8 represents the Q-switch with a lower attenuation than the other two curves, and the middle curve 802 represents less attenuation of the Q-switch than the top curve 803.

For each given value of Q-switch attenuation, i.e., each curve on FIG. 8, an optimum mode alignment occurs at each local minimum in the curve. In other words, each local minimum on a curve indicates a cavity mode aligned with the gain peak. It will be seen that a shift of about 5 microns in cavity length will result in another local minimum and thus an alternative optimum alignment point; this is as expected, since as above this results in the next cavity mode being located at the gain peak of the seed laser.

As above, in this example the mirror can move 15 microns and cover three cavity modes. Since the alignment of each of the three cavity modes with the gain peak results in a local minimum, there will thus be three local minima 804 for curve 801, three local minima 805 for curve 802, and three local minima 806 for curve 803. (Horizontal shifts in the minima between the three curves reflect drift in the cavity length between the scans; if the cavity length were not expanding or contracting, the minima would be in the same places.) Algorithms for seeking the local minimum of such curves are well known in the art.

One of skill in the art will appreciate that in some cases the seed laser will shift through more than three modes; in fact, some lasers may go through over 30 modes upon startup. Since an actuator that can only move the mirror through a few modes will of course run out of range, a known technique of "range wrapping" or "actuator de-saturation" may be employed periodically to return the actuator (and mirror) to the middle of its operating range.

Figure 9:
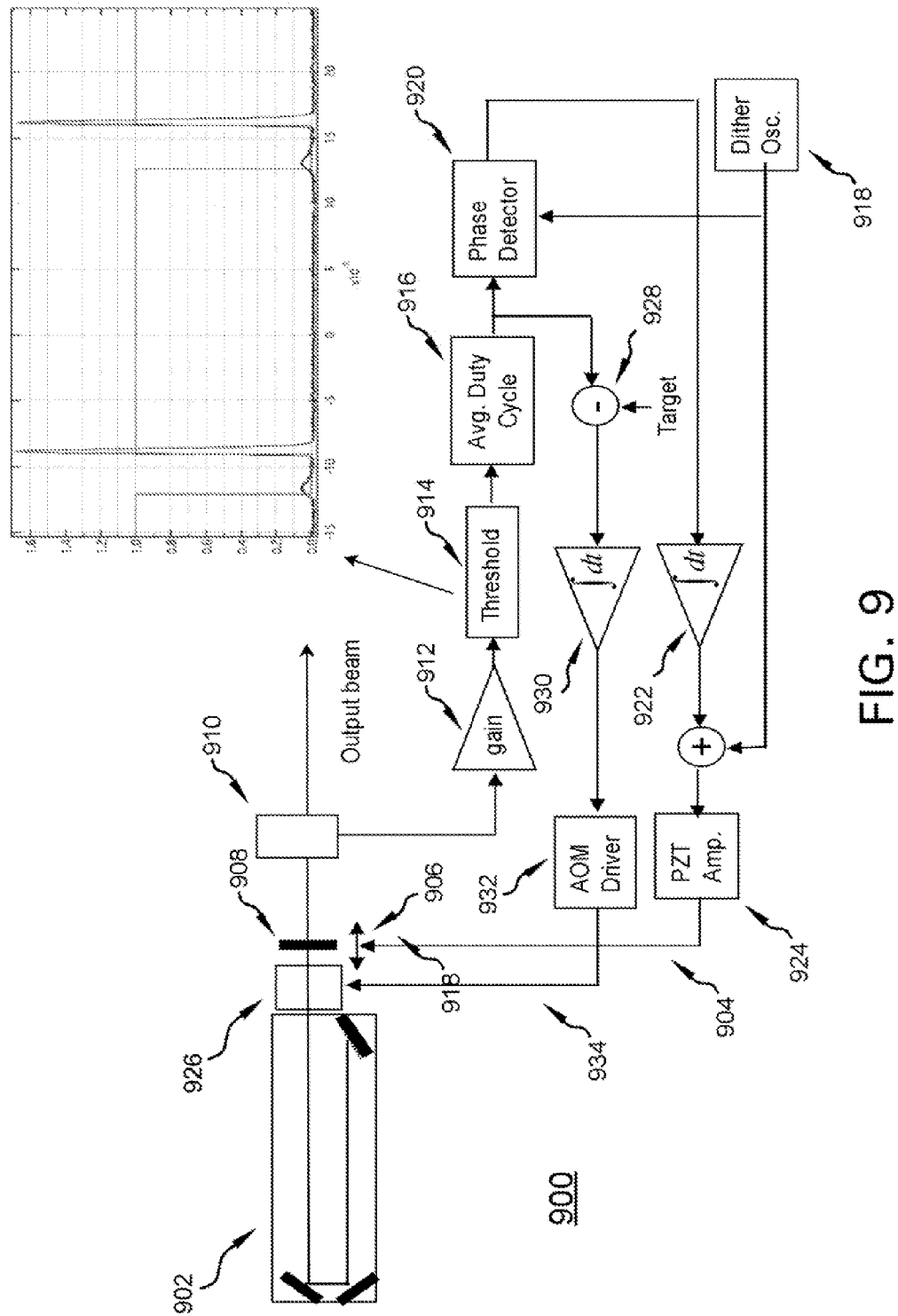
FIG. 9 is a simplified block diagram of a system for stabilizing a seed laser in one embodiment.

FIG. 9 is a block diagram of one embodiment of an apparatus 900 for stabilizing a seed laser 902. (This apparatus operates only on the seed laser(s) and is independent of the other components illustrated above for treating and utilizing the laser pulses; it would thus, for example, be contained within the illustrated seed lasers 32 and 34 on FIG. 2.) There are two control loops 904 and 934. Control loop 904 causes PZT actuator 906 to move mirror 908 so as to control the length of the cavity of seed laser 902, similarly to the device in FIG. 6 above, while control loop 934 controls the attenuation of the Q-switch 926 in seed laser 902.

A PEM sensor 910 measures the power of the Q-switched pulse, and the resulting signal is amplified by amplifier 912. The average pre-lasing delay is extracted by thresholding the signal with an element 914 and then averaging by an averager 916. From this, a comparison of the mirror position to the delay time T from full pulse to pre-lasing can be calculated, as shown in the curves of FIG. 8.

The position of mirror 908 is dithered at a low frequency, for example, 1 to 2 Hz, by a modulator 918 to move the mirror over the desired range. Since the amplitude and phase of the average duty cycle depends upon to which side of the minimum the current operating point is located, a phase detector 920 receives the average duty cycle value and current mirror position and recovers the signed amplitude of the resulting modulation in the average duty cycle. When the mirror position is at the desired minimum of a curve of FIG. 8, the amplitude of this signal approaches zero.

This signal is integrated by integrator 922, added to the dither signal, and amplified by PZT amplifier 924, which drives PZT actuator 906 to move mirror 908 if necessary. One of skill in the art will appreciate that control loop 904 is thus a typical "hill climbing" loop that tracks the position of the PZT actuator 906, finds the point at which the modulation in the duty cycle, and thus delay time T, is at a minimum, and generates a feedback signal to hold mirror 908 at that point. In some embodiments, the various mathematical functions are performed by analog circuits, while in other embodiments a computer processor may be used.

Control loop 934 is a typical integral convergence loop that operates to control the attenuation from Q-switch 926. As above, it is desirable to have pre-lasing occur at a time that is not too early and not too late. In control loop 934, the average duty cycle value from averager 916 is compared to a target value by comparator 928. The difference is integrated by integrator 930, and the result convened by Q-switch driver 932 into a signal that controls the attenuation by Q-switch 926, increasing or decreasing the attenuation appropriately if the average duty cycle value is different than the target value. This will drive the attenuation in Q-switch to the desired target value and time the pre-lasing so that the efficiency of the seed laser stays high.

Figure 10:
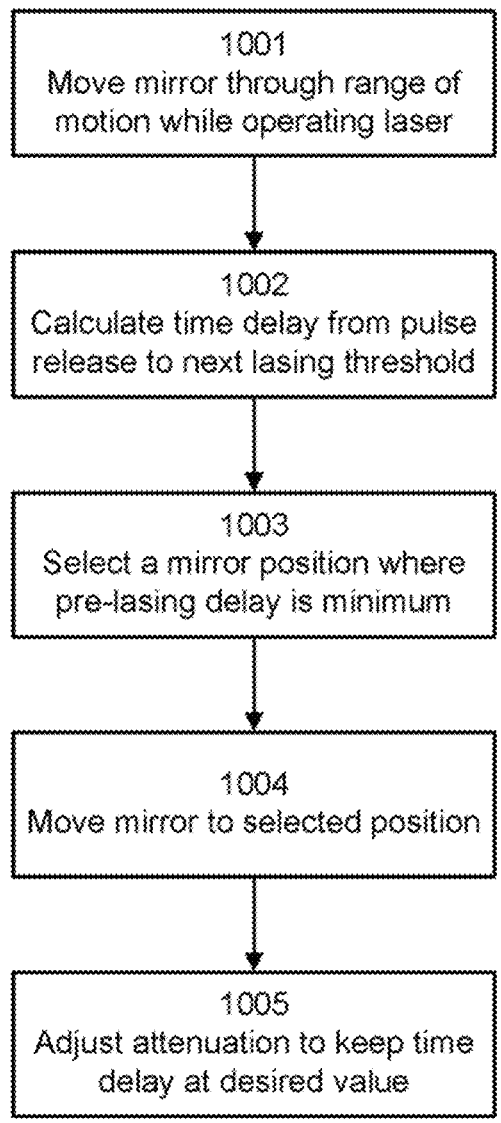
FIG. 10 is a flowchart of one embodiment of a method of stabilizing a seed laser as described herein.

FIG. 10 is to flowchart of a method of stabilizing a seed laser according to one embodiment. At step 1001, a movable mirror defining one end of the optical cavity of the laser is moved through a predetermined range of motion, typically by a computer-controlled actuator. As above, the range of motion is preferably about 5% of a cavity FSR.

At step 1002, the time delay from the output of a pulse to the next lasing threshold and the commencement of pre-lasing is calculated while the mirror is moved through this range of motion.

As described above, the average output energy will be at a maximum, and the time delay from the output of a pulse to the next lasing threshold and the commencement of pre-lasing will be at a minimum for a given attenuation by a Q-switch variable attenuator) in the laser, when a cavity mode is located at the gain peak of the laser. If the mirror's range of motion extends over three cavity modes, there will be three possible positions of the mirror that will produce this result.

At step 1003 one of these mirror positions is randomly selected, and the mirror moved to the selected position at step 1004. As the cavity expands, the curves of FIG. 8 will drift to the right or the left, and the control loop will cause the mirror to move to follow the chosen minimum position until the limit of the mirror's range of motion is reached. The control loop will then "wrap" the control point to get back within the mirror's range and select another minimum point, preferably near the center of the range.

At step 1005, the attenuation by the Q-switch is adjusted if necessary to keep the attenuation, and thus the delay time, to a desired value. As above, it is preferable that the delay time not be too short, in which case pre-lasing may not occur in time to allow the output pulse to be generated when the Q-switch is opened, or too long, in which case power will be wasted in pre-lasing.

These steps are repeated while the laser is in operation, providing feedback signals to keep the laser operating at the desired points. In this way, the seed laser is stabilized so that it operates close to its maximum efficiency. If the cavity length changes due, for example, to thermal expansion, the mirror position will be adjusted to keep a cavity mode at the gain peak of the laser. In addition, the timing delay will kept at a desired value so that the laser pulses are released when the Q-switch is opened without temporal jitter. Controlling the output frequency also prevents losses in subsequent amplification of the laser pulses.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used, and possibly different types of drive lasers and/or focus lenses.

As noted herein, various variations are possible. A single seed laser may be used in some cases, and two seed lasers, a pre-pulse seed laser and a main pulse seed laser, in other cases. Where two seed lasers are used, both may be stabilized independently as described herein.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic communication links. Such program instructions may be executed by means of a processor or controller, or may be incorporated into fixed logic elements. It should be noted that the order of the steps of the methods described herein may be altered and still be within the scope of the disclosure.

These and other variations upon the embodiments are intended to be covered, by the present disclosure, which is limited only by the appended claims.

What is claimed is:

1. A system for producing output laser pulses, comprising:
a laser having an optical cavity including a movable optical component, such that moving the optical component changes the length of the optical cavity, the laser pre-lasing when power in the optical cavity reaches a pre-lasing threshold and lasing when power in the optical cavity reaches a lasing threshold;
an actuator for positioning the optical component within a predetermined range;
a variable attenuator in the optical cavity for limiting the rate at which power in the laser increases and thus controlling the times at which the pre-lasing and lasing thresholds are reached and the time at which the output pulse is released;
a sensor for measuring the output power of the laser at a given moment;
a computing device for calculating the time delay from the release of an output pulse to the time the pre-lasing threshold is again reached; and
a first feedback loop having a first controller for causing the actuator to position the optical component so that the calculated time delay from the release of an output pulse to the time the pre-lasing threshold is again reached is at a minimum.

2. The system of claim 1 further comprising a second feedback loop having a second controller for causing an adjustment in the variable attenuator based upon the calculated time delay to keep the time delay from the release of an output pulse to the time the pre-lasing threshold is again reached at a desired value.

3. The system of claim 1 wherein the variable attenuator is an acousto-optic module.

4. The system of claim 1 wherein the variable attenuator is an electro-optic module.

5. The system of claim 1 wherein the optical component is a mirror at one end of the optical cavity.

6. The system of claim 1 wherein the optical component is a grating within the optical cavity.

7. The system of claim 1 wherein the computing device is a processor.

8. The system of claim 1 wherein the computing device is an analog circuit.

9. The system of claim 1 wherein the predetermined range for positioning the optical component is a distance at least equal to a free spectral range of the cavity.

10. The system of claim 1 wherein the first feedback loop further comprises a computing device for:
causing the actuator to move the optical component over the predetermined range while the variable attenuator remains at a fixed attenuation value;
comparing the calculated time delay to the position of the optical component across the predetermined range; and
causing the actuator to position the optical component at a location at which the time delay is at a local minimum value.

11. A method of maximizing the output of a laser that produces output pulses, the laser having an optical cavity with a length and including a optical component that is movable through a predetermined range, such that moving the optical component changes the length of the optical cavity, pre-lasing occurring when power in the optical cavity reaches a pre-lasing threshold and lasing occurring when power in the optical cavity reaches a lasing threshold, and a variable attenuator in the optical cavity for limiting a rate at which power increases in the laser and thus controlling a time at which the pre-lasing and lasing thresholds are reached and a time at which an output pulse is released, the method comprising:
operating the laser by a computing device while moving the optical component through the predetermined range of motion;
measuring with a sensor an output energy of the laser at a plurality of times during the moving of the optical component;
calculating by the computing device a time delay from the release of an output pulse to the pre-lasing threshold next being reached;
selecting by the computing device a position of the optical component at which the calculated time delay is at a minimum; and
moving the optical component to the selected position by an actuator based upon the selected position.

12. The method of claim 11, further comprising adjusting the variable attenuator by a controller based upon the calculated time delay to keep the time delay at a desired value.

13. The method of claim 11, wherein the predetermined range of motion is a distance at least equal to a free-spectral range of the cavity.

14. The method of claim 11 wherein operating the laser by a control device while moving the optical component through the predetermined range of motion further comprises keeping the variable attenuator at a fixed attenuation value during the moving of the optical component, and selecting by the computing device a position of the optical component at which the calculated time delay from the release of an output pulse to the lasing threshold next being reached is at a minimum further comprises:
calculating by the computing device the time delay relative to the position of the optical component across the predetermined range;
locating by the computing device one or more positions of the optical component at which the time delay is at a local minimum value; and selecting by the computing device one of the located positions for the optical component at which the time delay is at a local minimum value.

15. The method of claim 11 wherein the computing device is a processor.

16. The method of claim 11 wherein the computing device is an analog circuit.

17. The method of claim 11 wherein the optical component is a mirror at one end of the optical cavity.

18. The method of claim 11 wherein the optical component is a grating within the optical cavity.

19. A non-transitory computer-readable medium having embodied thereon a program, the program being executable by a processor to perform a method of maximizing the output of a laser that produces output pulses, the laser having an optical cavity with a length and including an optical component that is movable through a predetermined range, such that moving the optical component changes the length of the optical cavity, pre-lasing occurring when power in the optical cavity reaches a pre-lasing threshold and lasing occurring when power in the optical cavity reaches a lasing threshold, and a variable attenuator in the optical cavity for limiting a rate at which power increases in the laser and thus controlling a time at which the pre-lasing and lasing thresholds are reached and a time at which an output pulse is released, the method comprising the steps of:

operating the laser by a control device while moving the optical component through the predetermined range of motion;

measuring with a sensor an output energy of the laser at a plurality of times during the moving of the optical component;

calculating by the control device a time delay from the release of an output pulse to the pre-lasing threshold next being reached;

selecting by the control device a position of the optical component at which the calculated time delay is at a minimum; and moving the optical component to the selected position by an actuator based upon the selected position.

\* \* \* \* \*